Aug. 2, 1927.  
G. A. MITCHELL  
1,637,529  
FOCUSING INSTRUMENT FOR CAMERAS AND THE LIKE  
Filed Aug. 28, 1926  
2 Sheets-Sheet 1
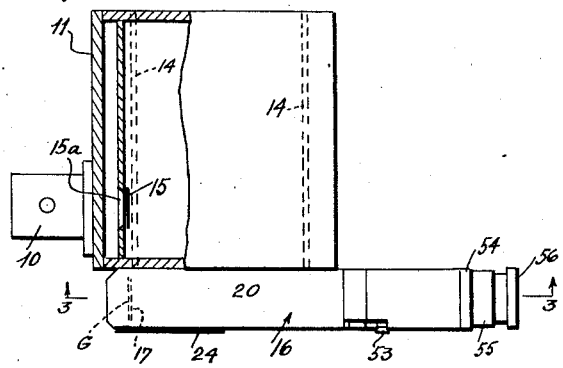
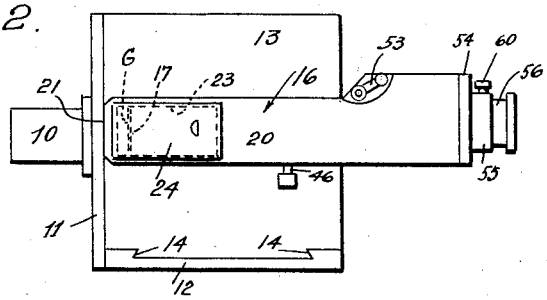
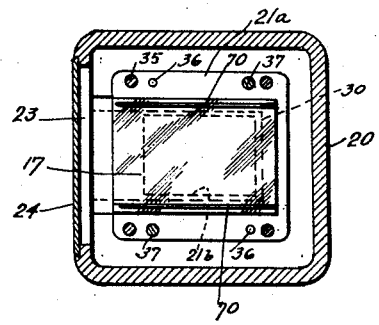
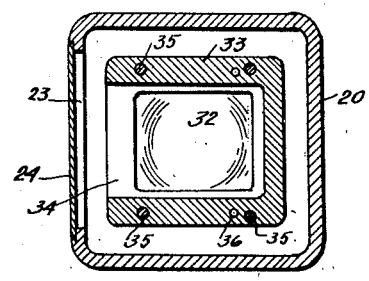
Inventor
George A. Mitchell
Attorney.

Aug. 2, 1927.
G. A. MITCHELL
1,637,529
FOCUSING INSTRUMENT FOR CAMERAS AND THE LIKE
Filed Aug. 28, 1926 2 Sheets-Sheet 2
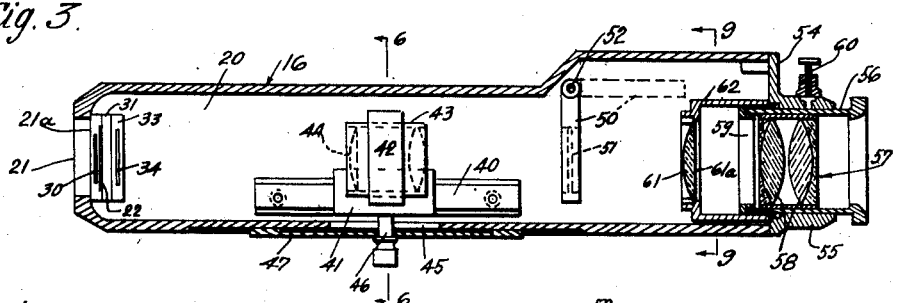
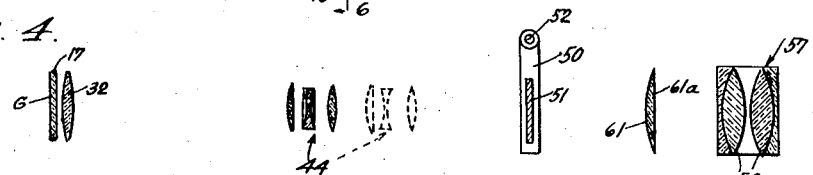
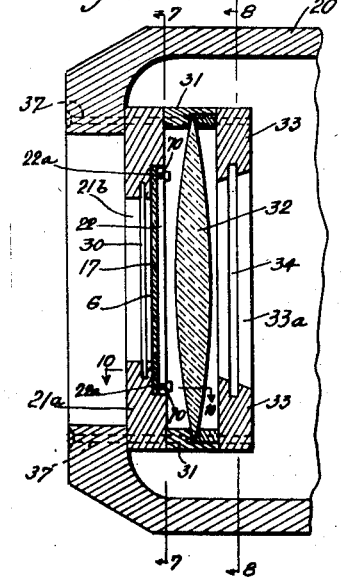
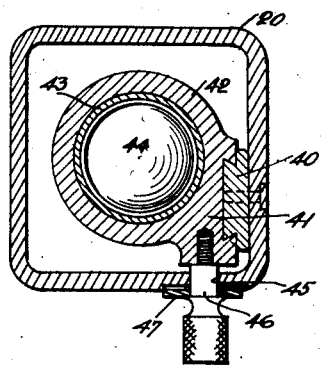
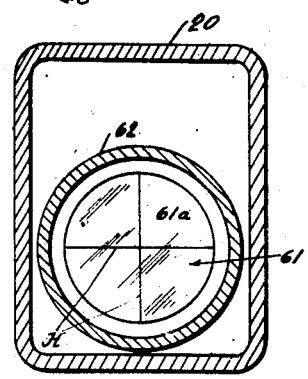
Inventor.
George A. Mitchell.
Attorney.

Patented Aug. 2, 1927.

1,637,529

UNITED STATES PATENT OFFICE.

GEORGE A. MITCHELL, OF LOS ANGELES, CALIFORNIA, ASSIGNOR TO MITCHELL CAMERA CORPORATION, A CORPORATION OF CALIFORNIA.

FOCUSING INSTRUMENT FOR CAMERAS AND THE LIKE.

Application filed August 28, 1926. Serial No. 132,089.

This invention has to do with focusing instruments for cameras and the like, a general object of the invention being to provide a highly effective but comparatively simple focusing device by means of which a camera, and particularly a motion picture camera, may be brought very accurately into focus.

While the invention is applicable to cameras other than motion picture cameras it is particularly useful on that specific type of camera where the image cast upon the film is comparatively small, that small image is greatly magnified in projection, and it is therefore necessary to obtain very accurate focus. While I speak of my invention as being a focusing instrument, it will also be apparent from what I say hereinafter that it is or may be at the same time a view finder, although view finders are usually and most conveniently used without actually viewing the image from the photographic lens itself as is done in my focusing device.

The present focusing instrument is somewhat similar in its general method of use to that set forth in my U. S. Letters Patent No. 1,584,186, dated May 11th, 1926, in that the instrument is so mounted that it may be shifted into position to take the image which normally falls upon the film itself, the ground glass of the focusing instrument taking accurately the position normally occupied by the film; the improvements which are the subject matter of the present invention having to do with the focusing instrument itself, with a view to great accuracy, comparative simplicity of operation and structure, and the provision of various attachments which are found particularly useful as applied to motion picture cameras.

With these preliminary observations in mind the invention will now be best understood from a specific and illustrative form thereof, reference for this purpose being had to the accompanying drawings, in which:

Fig. 1 is a plan with parts broken away for purposes of illustration, showing more or less diagrammatically the application of my focusing instrument to a camera;

Fig. 2 is a side elevation of the same;

Fig. 3 is a central longitudinal vertical section, with certain parts in elevation of the focusing instrument taken as indicated by line 3—3 on Fig. 1;

Fig. 4 is a diagram illustrating the optical arrangement of the various parts of the focusing instrument;

Fig. 5 is an enlarged vertical section of the forward parts of the focusing instrument;

Fig. 6 is a cross section on line 6—6 of Fig. 3;

Fig. 7 is a reduced cross section on line 7—7 of Fig. 5;

Fig. 8 is a reduced cross section on line 8—8 of Fig. 5;

Fig. 9 is an enlarged cross section on line 9—9 of Fig. 3; and

Fig. 10 is an enlarged detail section taken as indicated by line 10—10 on Fig. 5.

Referring first briefly to Figs. 1 and 2, I show there in diagrammatic form a camera with a photographic lens 10 carried on a front plate 11 which is mounted on a base 12 on which the camera body 13 is transversely horizontally slidable in ways 14. The film in its normal position is shown at 15. By sliding the whole body 13, together with the focusing instrument 16 attached thereto, the ground surface G of ground glass 17 may be accurately put into the position of film 15 behind photographic lens 10, so that whatever image is normally received by the film will then be received by the ground glass surface. By means of the focusing instrument the image on the ground glass surface may then be viewed and the photographic lens adjusted to bring that image to just the focus desired.

While I refer to the use of a ground glass to receive initially the image from the photographic lens, I shall point out hereinafter how the ground glass may be eliminated if desired, although in ordinary practice it is desirable to use the ground glass or some equivalent element. Furthermore when I refer to the ground glass it will be understood that I mean to include any suitable surface on which the image from the photographic lens may be received. In general, any translucent surface will satisfy such requirements.

The focusing instrument itself is made up of a suitable tube 20, preferably square or rectangular in cross section and mounted upon camera body 13. At its forward end this tube has a surface 21 which slides over the rear face of front plate 11, preferably in substantially light excluding engagement therewith. Immediately inside the forward end of tube 20 is mounted the mat and ground glass carrier 21ª having at its rear face a recess 22 in which ground glass 17 is carried. Recess 22 opens out at one end to one side of carrier 21, as is clearly shown in Figs. 7 and 10; and tube 20 has in its side an opening 23 covered by a slide 24 for access to the interior of the tube and to the ground glass and the mat or screens to be hereinafter described. Immediately forward of the ground glass recess carrier 21 has a mat receiving slot 30 which also opens out at one end to the side of carrier 21 so that any desired mat may be placed in the carrier immediately in front of the ground glass. The slot 30 is placed as close as is practicable to the forward ground surface of the ground glass so that the mat may be as closely as possible in the focal plane.

Immediately to the rear of carrier 21 and mounted thereon is another carrier 31 for a collector 32; and immediately to the rear of carrier 31 and mounted thereon is a third carrier 33 for a mat or screen. This carrier 33 also has in it a slot 34 which leads out at one end to the side of the carrier so that a mat may be placed or removed through the tube opening 23. The several carriers 21ª, 31 and 33 may be secured together by suitable screws 35 and accurately registered with each other by dowels 36, and the whole assembly may be secured in tube 20 by suitable screws 37. The purpose and use of the mats will be explained hereinafter. The purpose of collector 32 is to converge the rays of light from the image on the ground glass and thus to gather more light than would otherwise be the case, so as to produce good illumination in the final image as viewed at the eye piece.

In the medial portion of tube 20, and preferably on its side wall, is mounted a guide 40 on which a slider 41 may be moved longitudinally. This slider 41 carries a ring 42 which in turn carries lens tube 43 in which a lens 44 is mounted. Lens 44 may be any suitable image forming lens, but in the present practical arrangement which I am using this lens is an ordinary photographic or objective lens of 50 mm. focal length, and is made up of several lens glasses, as is indicated in Fig. 4. Depending from slider 41 and extending through slot 45 in the lower wall of tube 20 is a stud 46, and a small cover plate 47 mounted on the stud covers slot 45 at all times. The two operative limiting positions of lens 44 are determined by pin 46 striking the two ends of slot 45, this slot being accurately machined at least at its ends, so that lens at its two stopped positions is positioned accurately.

Behind lens 44 there is a swinging carrier 50 for a transparency 51 which I will term a blue glass. The purpose of this transparency is to pass predominantly or characteristically the light which predominantly affects an actinic film, so that in the focusing instrument the image may be viewed in substantially the same light which is afterwards to affect the film. Carrier 50 is mounted on horizontal pivot shaft 52 and a small handle 53 is provided exteriorly of tube 20 so that the carrier may be swung between the two positions shown in Fig. 3, the blue glass being thereby thrown up and out of the optical system when desired.

The rear end of tube 20 is closed by an end fitting 54 carrying a circular boss 55 through which the tube 56 of eye piece 57 slides, for adjustment to individual eyes. Eye piece 57 may be composed of any suitable lenses 58, such as illustrated in Fig. 4. A ring 59 at the forward end of eye piece tube 56 prevents the entire withdrawal of the eye piece, and a set screw 60 is provided for setting the eye piece in adjusted position.

Within tube 20 and immediately forward of the eye piece is a collector 61, preferably in the form of a plano-convex lens, with its plane face 61ª preferably to the rear. Collector 61 is mounted in a tube 62 which in turn is mounted upon end fitting 54, so that the collector is rigidly mounted in position accurately with relation to the forward ground glass 17.

Although of course the relative dimensions of the instrument may be varied as may be desired or necessary, in the present practical form I am using in collector 32 a lens of 53 mm. focal length, lens 44 is a 50 mm. objective, collector lens 61 is of 112 mm. focal length, and the eye piece lens made up of two plano-convex lenses each of 85 mm. focal length. Collective lens 61 is preferably of a size large enough to take on its plane surface the whole image that is cast by lens 44 when in its rear position. Ground glass 17 is of suitable size to take just the same field as is taken in what is termed a "frame" on the film. The aperture 21ᵇ in the ground glass carrier is made accurately of the same size as exposure aperture 15ª before film 15. Aperture 33ª in the rearmost mat carrier 33 is made somewhat larger than aperture 21ᵇ.

Using the focal length above stated, and placing the two surfaces G and 61ª at approximately eight and seven-thirty seconds inches apart, there is a certain position of lens 44, the rearmost position in Fig. 4, in which that lens will project upon lens surface 61ª an image of the image on the ground surface G, the image on 61ª being of about five-eighths the linear dimensions of the image at G. At another position of lens 44, its forward position as shown in full lines in Fig. 4, the image thrown by lens 44 from the image on surface G will again be accurately focused on surface 61ª, but will be about eight-fifths times as large as its image on G. Consequently by shifting lens 44 from one position to the other, either the whole "frame" may be viewed in the focusing instrument or a portion proportionately further magnified may be viewed, it being understood that the eye piece in each case also magnifies the image thrown upon surface 61$^a$ (in this specific embodiment giving final magnifications of about five and ten diameters of the image at G).

In giving the proportionate figures and dimensions above I do not mean them to be a necessary limitation upon the invention. The particular proportions, dimensions and focal lengths have been chosen and my present working embodiment of the invention gives proportional magnifications above explained. However, it will be well understood that it is possible by proper determination of the distances between surfaces G and 61$^a$, together with the focal lengths of the several lenses and eye piece and the amount of movement of lens 44, to make an instrument of this character which will in one position of lens 44 give an image of a certain relative apparent size in the eye piece, and in the other position give a partial image relatively magnified by any relative number of times desired.

The general considerations governing the relations between the focal lengths of lenses 32, 44 and 61 and the distance between surfaces G and 61$^a$ may be explained as follows: if the two collective lenses 32 and 61 were to be eliminated, then the optical distance between surfaces G and 61$^a$ shall in any case be more than four times the focal length of lens 44; so that in one determined position of that lens it will throw a reduced image of surface G onto surface 61$^a$, and in the other determined position will throw an enlarged image of surface G onto 61$^a$. The insertion of either or both the collective lenses 32 and 61 has the effect of shortening the resultant focal length of the several lenses when considered as a unitary optical system; or the insertion of one or both these collective lenses might be explained as relatively increasing the effective optical distance between surfaces G and 61$^a$. Thus, in a system that uses the collective lenses, the actual measured distance between G and 61$^a$ might not in some cases be more than four times the focal length of lens 44, although what I call the effective optical distance between G and 61$^a$ will be greater than four times the focal length of lens 44. This precise relationship, although possible in my instrument, does not happen to be the case with the specific distances and focal lengths given above; but in any case the effective optical distance between G and 61$^a$ is more than four times the focal length of lens 44, or the resultant focal length of lens 44, together with the collective or collectives interposed, is less than one-quarter of the actual distance between G and 61$^a$.

Eye piece 57 is adjusted in position, to suit the individual eye, in focus on cross lines H on surface 61$^a$; after it is once adjusted it need not further be moved for the individual eye. Thus, in using the instrument the operator knows that when, in any adjustment of photographic lens 10, he sees a clearly focused image through the eye piece he then has a clearly and sharply focused image on surface G in the plane of the film. To aid in obtaining a sharp focus, or a sharp focus on any particular desired part of the scene, the user may shift lens 44 forward and observe particularly any such desired part of the scene; and that part being comparatively greatly magnified, the operation of focusing by proper adjustment of the photographic lens 10 is greatly facilitated.

The use of a ground glass at G greatly facilitates accurate focusing. Although, if no ground glass were used, and if the eye piece were known to be accurately in focus on 61$^a$, theoretically the appearance of a sharp image in the eye piece should mean the presence of a sharp image at the plans of the film; in practice the accommodation of the eye is such that the image supposed to be at G might be quite out of that plane. Consequently, in practice it is desirable to have a defined reference plane defined at G; and the ground glass is most convenient, although a pair of cross lines may be substituted and the accuracy of focus at the defined plane then determined by parallax.

I have said that the function of collector 32 is merely to collect light from the image at G. The function of the collector 61 is also merely a light gathering function to produce a high illumination of the whole field viewed through the eye piece. Either or both collects may therefore be omitted; but in practice a relatively poor illumination results.

The two mat carriers at the front of the tube may be conveniently and effectively used for carrying mats or other screen for various purposes. The use to which such mats may be put are in general well understood in the motion picture art and need not here be explained in detail. The mat in the rear carrier 33 is in such a position that it can be reached through opening 23 to be marked upon. For instance a transparency or translucency may be used, and any given image may be marked out and afterwards cut to the proper shape. Mats may be used in the forward carrier 21 for various purposes. For instance, in what is known as double exposure work, where it is necessary to get a second exposure located accurately with reference to the first exposure, a "frame" of the film of the first exposure may be placed in carrier 21ª and the second exposure may thus be accurately located so that the image will be cast upon the camera film in correct relative position to be properly combined with the film of the first exposure. Many other uses of mat carriers will occur to those skilled in the art. Also for the purpose of accurately locating any particular object in a field of view or for accurately locating any image in the field of view or with relation to any other image, for instance in double exposure, the surface 61ª has the cross lines H.

Not only are the mats removable and replaceable by sliding them into and out of their slides through the side opening 23, but the ground glass is also likewise removable and replaceable. The ground glass, when in place, is held in position with its ground face forward against shoulder 22ª by a pair of small springs 70, which are held at each end in small grooves 71 in the face of carrier 31 which lies against carrier 21ª, the springs being bent so as to press against the ground glass and hold its ground face accurately and firmly against shoulder 22ª. The position of the ground surface is thus very accurately determined.

I claim:

1. A focusing instrument for cameras, embodying a defined image receiving plane adapted to receive an image from a photographic lens of a camera, a second defined image receiving plane spaced fixedly from the first mentioned image receiving plane, and an objective lens positioned between the two said planes and movable to and from them into positions in each of which it casts an image from the first mentioned plane into the second mentioned plane.

2. A focusing instrument for cameras, embodying a translucent image receiving surface adapted to receive an image from a photographic lens of a camera, a defined image receiving plane spaced fixedly from the image receiving surface, and an objective lens positioned between the said surface and plane and movable to and from them into positions in each of which it casts an image of the first mentioned surface into the defined plane.

3. A focusing instrument for cameras, embodying an image receiving surface adapted to receive an image from a photographic lens of a camera, a second image receiving surface spaced fixedly from the first mentioned image receiving surface, and an objective lens positioned between the two said surfaces and movable to and from them into positions in each of which it casts an image of the first mentioned surface onto the second mentioned surface.

4. A focusing instrument for cameras, embodying an image receiving surface adapted to receive an image from a photographic lens of a camera, a second image receiving surface spaced fixedly from the first mentioned image receiving surface, and an objective lens positioned between the two said surfaces and movable to and from them into positions in each of which it casts an image of the first mentioned surface, and a substantially monochromatic filter movable into and out of position on the optical axis of the surfaces and lens.

5. A focusing instrument for cameras, embodying an image receiving surface adapted to receive an image from a photographic lens of a camera, a second image receiving surface spaced from the first, an objective lens between the surfaces adapted to cast an image of the first mentioned surface onto the second, a magnifying lens for viewing the second mentioned surface, and a substantially monochromatic filter movable to and from a position between a surface and a lens.

6. A focusing instrument for cameras, embodying an image receiving surface adapted to receive an image from a photographic lens of a camera, a second image receiving surface spaced fixedly from the first mentioned image receiving surface, and an objective lens positioned between the two said surfaces and movable to and from them into positions in each of which it casts an image of the first mentioned surface onto the second mentioned surface, and a magnifying eyepiece for viewing the second mentioned surface.

7. A focusing instrument for cameras, embodying a translucent image receiving surface adapted to receive an image from a photographic lens of a camera, a second image receiving surface spaced fixedly from the first mentioned image receiving surface, and an objective lens positioned between the two said surfaces and movable to and from them into positions in each of which it casts an image of the first mentioned surface onto the second mentioned surface, and a magnifying eye-piece for viewing the second mentioned surface.

8. A focusing instrument for cameras, embodying a tube, a translucent image receiving surface at the forward end of the tube adapted to receive an image from a photographic lens of the camera, a second image receiving surface spaced in the tube rearwardly of the first mentioned surface, and an objective lens positioned in the tube between the two said surfaces and movable limitedly on a line between them, said objective lens in each of its two limiting positions being adapted to cast an image of the first mentioned surface onto the second mentioned surface.

9. A focusing instrument for cameras, embodying an image receiving surface adapted to receive an image from a photographic lens of a camera, a second image receiving surface spaced fixedly from the first mentioned image receiving surface, and an objective lens positioned between the two said surfaces and movable to and from them into positions in each of which it casts an image of the first mentioned surface onto the second mentioned surface, the focal length of said objective lens being less than one fourth of the effective optical distance between the two said image receiving surfaces.

10. A focusing instrument for cameras, embodying a defined image receiving plane adapted to receive an image from a photographic lens of a camera, a second defined image receiving plane spaced fixedly from the first mentioned image receiving plane, an objective lens positioned between the two said planes and movable to and from them into positions in each of which it casts an image from the first mentioned plane onto the second mentioned plane, a collective lens between the first mentioned plane and the objective, and a collective lens between the second mentioned plane and the objective, the distance between the two planes being greater than four times the resultant focal length of said objective and the two said collective lenses.

11. A focusing instrument for cameras, embodying a tube, a translucent image receiving surface at the forward end of the tube adapted to receive an image from a photographic lens of the camera, a second image receiving surface spaced in the tube rearwardly of the first mentioned surface, and an objective lens positioned in the tube between the two said surfaces and movable limitedly on a line between them, said objective lens in each of its two limiting positions being adapted to cast an image of the first mentioned surface onto the second mentioned surface, the focal length of said objective lens being less than one fourth of the effective optical distance between the two said image receiving surfaces.

12. A focusing instrument for cameras, embodying a tube, a translucent image receiving surface at the forward end of the tube adapted to receive an image from a photographic lens of the camera, a second image receiving surface spaced in the tube rearwardly of the first mentioned surface, an objective lens positioned in the tube between the two said surfaces and movable limitedly on a line between them, said objective lens in each of its two limiting positions being adapted to cast an image of the first mentioned surface onto the second mentioned surface, a collective lens between the first mentioned surface and the objective, and a collective lens between the second mentioned surface and the objective, the distance between the two surfaces being greater than four times the resultant focal length of said objective and the two said collective lenses.

13. A focusing instrument for cameras, embodying a tube, a translucent image receiving surface at the forward end of the tube adapted to receive an image from a photographic lens of the camera, a transparent image receiving surface spaced in the tube rearwardly of the first mentioned surface, an objective lens positioned in the tube between the two said surfaces and movable limitedly on a line between them, said objective lens in each of its two limiting positions being adapted to cast an image of the first mentioned surface onto the second mentioned surface, a collective lens between the first mentioned surface and the objective, and a collective lens between the second mentioned surface and the objective, the distance between the two surfaces being greater than four times the resultant focal length of said objective and the two said collective lenses.

14. A focusing instrument for cameras, embodying a tube, a translucent image receiving surface at the forward end of the tube adapted to receive an image from a photographic lens of the camera, a collective lens positioned immediately behind said translucent image receiving surface, a second collective lens fixedly positioned at a point in and near the rear end of the tube, said last mentioned collective lens being plano-convex with its plane surface facing rearwardly, and having cross lines, an adjustable magnifying eyepiece mounted in the rear end of the tube for viewing said cross lined surface, an objective lens mounted in the tube between the two collective lenses and slidable longitudinally between two fixed limiting positions, the distance between the first mentioned image receiving surface and the surface at the rear of the second mentioned collective lens being greater than four times the resultant focal length of the two collectives and the objective lens, and the objective lens in either of its limiting positions being adapted to cast upon said cross lined surface an image of the first mentioned image receiving surface.

15. A focusing instrument for cameras, embodying a tube, a translucent image receiving surface at the forward end of the tube adapted to receive an image from a photographic lens of the camera, a collective lens positioned immediately behind said translucent image receiving surface, a second collective lens fixedly positioned at a point in and near the rear end of the tube, said last mentioned collective lens being plano-convex with a cross lined plane surfacing rearwardly, an adjustable magnifying eyepiece mounted in the rear end of the tube for viewing said ground surface, an objective lens mounted in the tube between the two collective lenses and slidable longitudinally between two fixed limiting positions, the distance between the first mentioned image receiving surface and the cross lined surface at the rear of the second mentioned collective lens being greater than four times the resultant focal length of the two collectives and the objective lens, and the objective lens in either of its limiting positions being adapted to cast upon said cross lined surface an image of the first mentioned image receiving surface, a carrier for the first mentioned image receiving surface within the forward end of the tube, said carrier having an open ended recess adapted to receive a ground glass forming said first mentioned image receiving surface and also having an open ended recess closely adjacent the first mentioned recess for receiving a mat or screen, and a second carrier mounted in association with the first mentioned carrier and adapted to hold and support said first mentioned collective lens.

16. A focusing instrument for cameras, embodying a tube, a translucent image receiving surface at the forward end of the tube adapted to receive an image from a photographic lens of the camera, a collective lens positioned immediately behind said translucent image receiving surface, a second collective lens fixedly positioned at a point in and near the rear end of the tube, said last mentioned collective lens being plano-convex with a cross lined plane surface facing rearwardly, an adjustable magnifying eyepiece mounted in the rear end of the tube for viewing said ground surface, an objective lens mounted in the tube between the two collective lenses and slidable longitudinally between two fixed limiting positions, the distance between the first mentioned image receiving surface and the cross lined surface at the rear of the second mentioned collective lens being greater than four times the resultant focal length of the two collectives and the objective lens, and the objective lens in either of its limiting positions being adapted to cast upon said cross lined surface an image of the first mentioned image receiving surface, a carrier for the first mentioned image receiving surface within the forward end of the tube, said carrier having an open ended recess adapted to receive a ground glass forming said first mentioned image receiving surface and also having an open ended recess closely adjacent the first mentioned recess for receiving a mat or screen, a second carrier mounted in association with the first mentioned carrier collective lens, a third carrier mounted in association with the other two carriers and behind the collective lens carrier and having an open ended recess adapted to receive a mat or screen, and the wall of the tube opposite said carriers being provided with an opening with a cover so that said carriers with their mats or screens and the said ground glass may be accessible from the exterior of the tube.

17. In a device of the character described, embodying a lens carrying tube, a carrier assembly positioned in the forward end of said tube and embodying a forward carrier having therein an open ended recess adapted to receive and hold a ground glass and also having another open ended recess closely adjacent the first mentioned recess and adapted to receive a mat or screen, an intermediate carrier mounted upon and in association with the forward carrier, a collective lens mounted in said intermediate carrier, a spring holder mounted in said intermediate carrier and pressing resiliently forwardly against the ground glass in the forward carrier to hold said ground glass in position, and a rearmost carrier having an open ended recess adapted to receive a mat or screen mounted upon and in association with said intermediate carrier, all of said recesses having their open ends facing in a common direction towards one side of said tube, and said tube having an opening in its side opposite said open recess ends, and a cover plate for said tube opening.

In witness that I claim the foregoing I have hereunto subscribed my name this 20th day of August 1926.

GEORGE A. MITCHELL.